(12) United States Patent
Ripplinger et al.

(10) Patent No.: US 11,932,365 B2
(45) Date of Patent: *Mar. 19, 2024

(54) USING ILLUMINABLE DYES TO FACILITATE SEARCH AND RESCUE

(71) Applicant: BATTLE SIGHT TECHNOLOGIES, LLC, Dayton, OH (US)

(72) Inventors: Nicholas R. Ripplinger, Dayton, OH (US); David Charles Di Staulo, Dayton, OH (US); Sunny L. Kapka, Dayton, OH (US); Grant David Santo, Dayton, OH (US); Jay Phillip-Donald Vallie, Dayton, OH (US); Christopher J. Vogt, Dayton, OH (US); Colton A. Whitman, Dayton, OH (US)

(73) Assignee: Battle Sight Technologies, LLC, Dayton, OH (US)

( * ) Notice: Subject to any disclaimer, the term of this patent is extended or adjusted under 35 U.S.C. 154(b) by 414 days.

This patent is subject to a terminal disclaimer.

(21) Appl. No.: 17/147,527

(22) Filed: Jan. 13, 2021

(65) Prior Publication Data

US 2022/0219795 A1   Jul. 14, 2022

(51) Int. Cl.
*B63C 9/00* (2006.01)
*C09K 11/07* (2006.01)
*G08B 5/00* (2006.01)

(52) U.S. Cl.
CPC .............. *B63C 9/00* (2013.01); *C09K 11/07* (2013.01); *G08B 5/002* (2013.01); *B63B 2201/04* (2013.01); *B63B 2201/22* (2013.01)

(58) Field of Classification Search
CPC .......... B63C 9/00; C09K 11/07; G08B 5/002; B63B 2201/04; B63B 2201/22; B63B 116/26

(Continued)

(56) References Cited

U.S. PATENT DOCUMENTS 3,816,325 A * 6/1974 Rauhut ............... C08K 5/0041
                                                      252/700
3,893,938 A * 7/1975 Rauhut .................... F21K 2/06
                                                      427/337

(Continued)

FOREIGN PATENT DOCUMENTS

EP            61558 A * 10/1982  ............ C09K 11/07

OTHER PUBLICATIONS

U.S. Appl. No. 17/005,530, entitled "Facilitating Search and Rescue", filed Aug. 28, 2020.

(Continued)

*Primary Examiner* — Douglas J McGinty
(74) *Attorney, Agent, or Firm* — Thomas E. Lees, LLC

(57) ABSTRACT

An apparatus that facilitates search and rescue, for example, in open water. The apparatus comprises a substrate with a particular geometry and a perimeter. The apparatus further comprises a cover positioned atop the substrate with the cover also having a particular geometry and perimeter, which correspond to the geometry and perimeter of the substrate. An air-tight seal seals the substrate perimeter to the cover perimeter and creates a sealed internal region. A liquid-releasable vessel holding an illuminable dye located in the sealed internal region, along with an activator that is also located in the sealed internal region. When the liquid-releasable vessel releases the illuminable dye, the illuminable dye reacts with the activator, thereby resulting in illumination of the illuminable dye. The liquid-releasable vessel comprises an opening with a release mechanism (e.g., clamp, etc.).

20 Claims, 8 Drawing Sheets

(58) Field of Classification Search
USPC .................................................. 116/26, 211
See application file for complete search history.

(56) References Cited

U.S. PATENT DOCUMENTS

| | | | | |
|---|---|---|---|---|
| 4,186,426 A | * | 1/1980 | Gingras, Sr. | ............... F21K 2/06 |
| | | | | 116/63 P |
| 4,640,193 A | * | 2/1987 | Koroscil | ................. C09K 11/07 |
| | | | | 42/15 |
| 5,381,311 A | * | 1/1995 | Fujita | ........................ F21K 2/06 |
| | | | | 206/219 |
| RE35,132 E | * | 12/1995 | Bay | ......................... C09K 11/07 |
| | | | | 252/700 |
| 6,115,873 A | * | 9/2000 | Dunkley | ................. A45D 34/04 |
| | | | | 15/210.1 |
| 7,976,727 B1 | * | 7/2011 | Naik | ..................... C09K 11/623 |
| | | | | 252/301.4 R |
| 9,074,857 B2 | * | 7/2015 | Cranor | .................... F42B 12/40 |
| 9,866,369 B1 | * | 1/2018 | Haynes | .................. H04L 7/0037 |
| 11,352,107 B2 | * | 6/2022 | Ripplinger | ................ B63C 9/20 |
| 2003/0111649 A1 | * | 6/2003 | Park | ..................... C07D 471/06 |
| | | | | 252/700 |
| 2011/0017091 A1 | * | 1/2011 | Cranor | ................... C09K 11/07 |
| | | | | 252/700 |
| 2011/0085318 A1 | * | 4/2011 | Cranor | ....................... F21K 2/06 |
| | | | | 362/34 |
| 2011/0255303 A1 | * | 10/2011 | Nichol | ................. G02B 6/0053 |
| | | | | 362/606 |
| 2012/0097063 A1 | * | 4/2012 | Cranor | ................... C09K 11/07 |
| | | | | 252/700 |
| 2012/0175275 A1 | * | 7/2012 | Palmer | ................... C09K 11/07 |
| | | | | 252/700 |
| 2016/0272287 A1 | * | 9/2016 | Covelli | .................... G01S 19/17 |
| 2018/0158305 A1 | * | 6/2018 | Noland | .............. G08B 21/0438 |
| 2023/0194226 A1 | * | 6/2023 | Longo | ....................... F21K 2/06 |
| | | | | 102/513 |

OTHER PUBLICATIONS

Hayes, Jovon E.; Office Action for U.S. Appl. No. 17/005,530; United States Patent and Trademark Office; Alexandria, VA; notification date Oct. 6, 2021.

* cited by examiner

USING ILLUMINABLE DYES TO FACILITATE SEARCH AND RESCUE

STATEMENT REGARDING FEDERALLY SPONSORED RESEARCH OR DEVELOPMENT

This invention was made with government support under FA 8652-19-P-WI13 awarded by the Department of Defense (Department of the Air Force, Air Force Materiel Command). The government has certain rights in the invention.

BACKGROUND

Field of the Disclosure

The present disclosure relates generally to search and rescue. More particularly, the present disclosure relates to maritime search and rescue.

Description of Related Art

Many hazards face individuals that are lost at sea or in other open water. The chances of survival diminish rapidly with time and, thus, there is a need to quickly find and rescue those that are in open water.

SUMMARY

An apparatus that facilitates search and rescue, for example, in open water. The apparatus comprises a substrate with a particular geometry and a perimeter. The apparatus further comprises a cover positioned atop the substrate with the cover also having a particular geometry and perimeter, which correspond to the geometry and perimeter of the substrate. An air-tight seal seals the substrate perimeter to the cover perimeter and creates a sealed internal region. A liquid-releasable vessel holding an illuminable dye located in the sealed internal region, along with an activator that is also located in the sealed internal region. When the liquid-releasable vessel releases the illuminable dye, the illuminable dye reacts with the activator, thereby resulting in illumination of the illuminable dye. The liquid-releasable vessel comprises an opening with a release mechanism (e.g., clamp, etc.).

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION OF THE EMBODIMENTS

Figure 1:
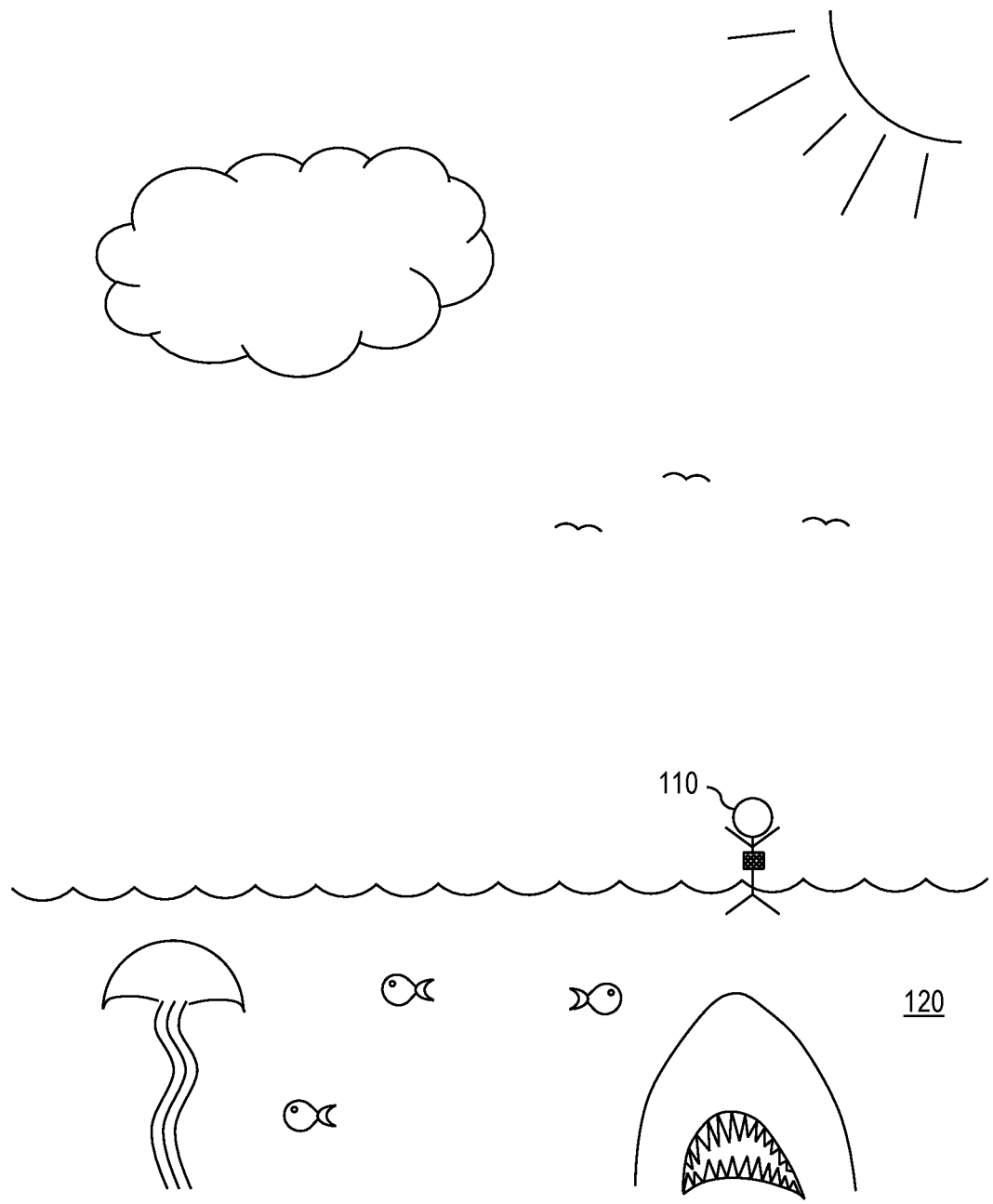
FIG. 1 is a diagram showing an individual with one embodiment of an apparatus that facilitates search and rescue in open water.

Search and rescue operations take place in many different environments, with each environment presenting its own challenges. For those that are lost in open water (e.g., large lakes, seas, oceans, etc.), the hazards include hostile temperatures, dangerous marine animals, and tumultuous waves. Thus, it is not surprising that the chances of survival diminish rapidly over time. Because of this, there is a need to quickly find and rescue those that are in open water.

To facilitate maritime search and rescue operations (or other open-water-based search and rescue operations), the present disclosure provides an illuminable dye and an activator. The activator is positioned at select locations. The illuminable dye is contained in a liquid-releasable vessel (e.g., pouch, bag, etc.). The liquid-releasable vessel comprises an opening and a release mechanism (e.g., releasable clamp, etc.) that controllably releases the illuminable dye through the opening. When the release mechanism is opened, the illuminable dye is released and, when activated by the activator, begins to luminesce. A liquid-releasable vessel with a releasable clamp operates under a different principle than a breakable vessel. This is because, unlike a breakable vessel, the releasable clamp can controllably release the contents of the vessel, can be closed, and can also be re-used. Conversely, once a breakable vessel is broken, then the release of the vessel's contents is automatic. Also, unlike a releasable clamp, the breakable vessel cannot be un-broken and, also, cannot easily be re-used.

For some embodiments, the apparatus has a geometry that, when released in open water, allows the apparatus to spread to a sufficiently large area, such that the apparatus becomes visible from a distance of at least six hundred meters (400 m) and, more preferably, at least 1.5 kilometers (km). The activator is placed at select locations in the apparatus so as to maximize visibility during search and rescue operations. For some embodiments, once the apparatus begins to luminesce, it becomes detectable using drones, space-based assets (e.g., satellites), or other unmanned vehicles.

Having provided a broad technical solution to a technical problem, reference is now made in detail to the description of the embodiments as illustrated in the drawings. While several embodiments are described in connection with these drawings, there is no intent to limit the disclosure to the embodiment or embodiments disclosed herein. On the contrary, the intent is to cover all alternatives, modifications, and equivalents.

To illustrate potential hazards in open waters, FIG. 1 shows an individual 110 that is lost in open water 120. The individual 110 is exposed to risks of hypothermia (if the water is cold) or drowning (if the waters are choppy or tumultuous). In addition to hypothermia and drowning, the individual 110 can be exposed to other hazards, such as, for example, flailing injuries to limbs and internal injuries from impacts (e.g., ejection from an aircraft, crash-related impacts, etc.). Additionally, the individual 110 can sometimes be surrounded by dangerous marine animals, such as, for example, stinging jellyfish or sharks. Furthermore, if the individual 110 is in an area that is teeming with fish, then the fish can also attract other predatory animals. Thus, a speedy rescue increases the chances of survival for an individual 110 in open water 120.

Figure 2A:
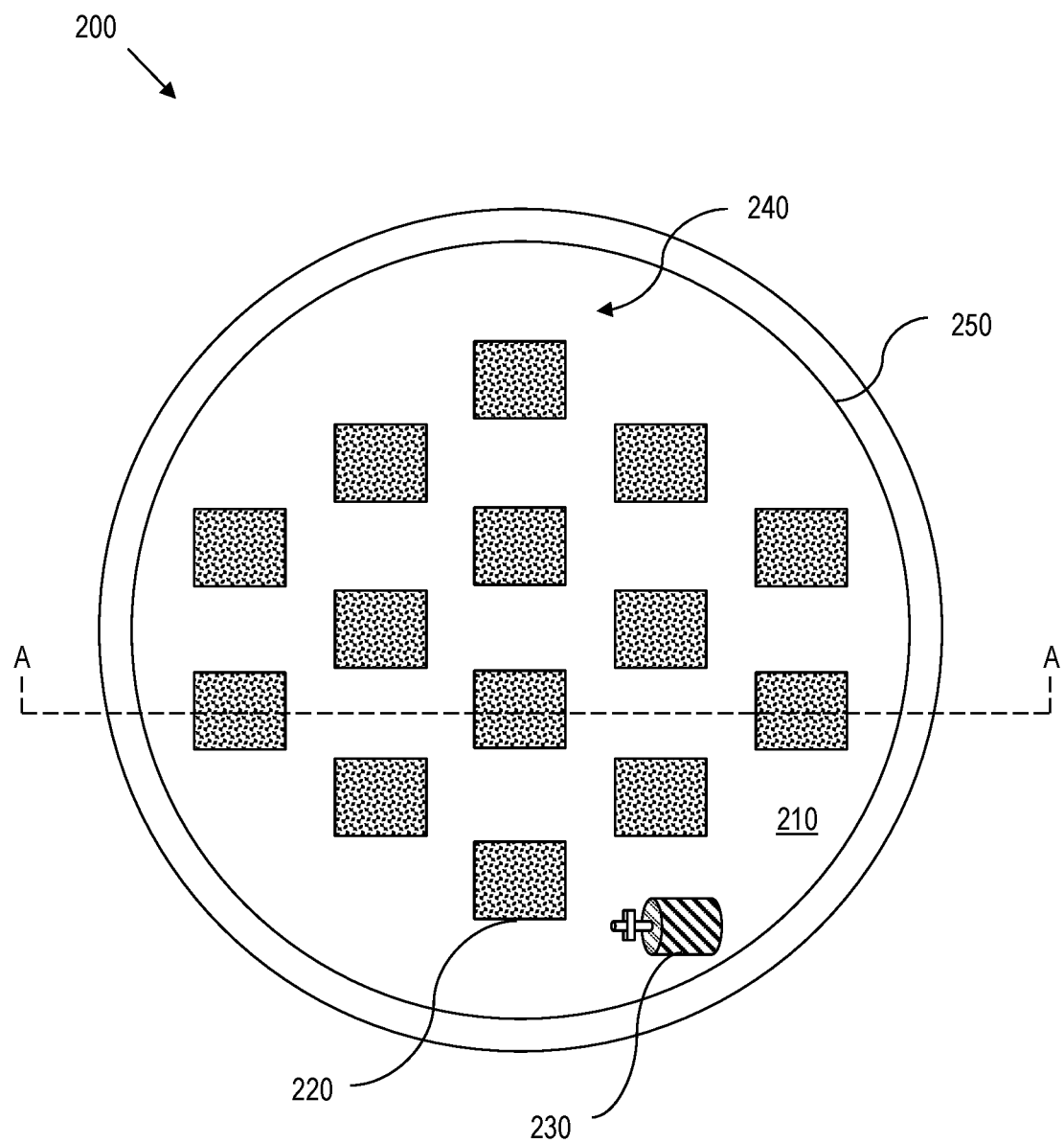
FIG. 2A is a diagram showing a top view of another embodiment of an apparatus that facilitates search and rescue.
Figure 2B:
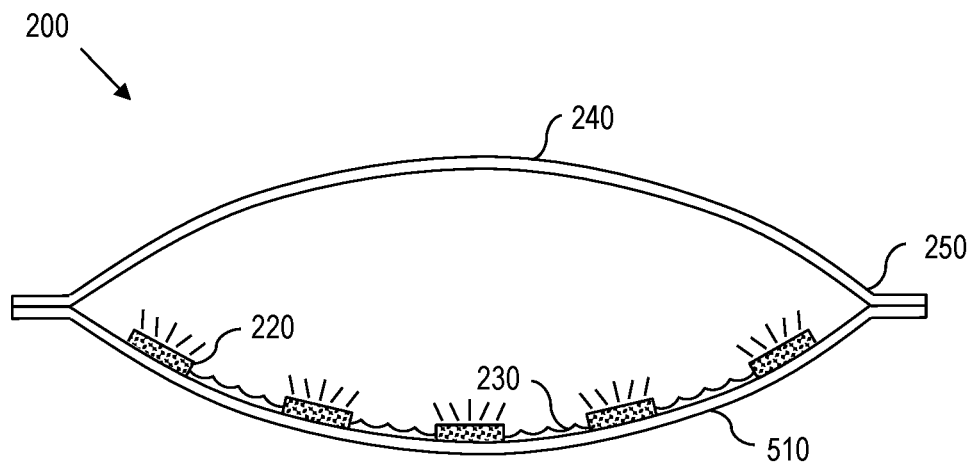
FIG. 2B is a diagram showing a side cut-away view of the apparatus of FIG. 2A upon deployment of the apparatus.

Turning now to FIGS. 2A and 2B, shown are both a top view (FIG. 2A) and a side view (FIG. 2B) of one embodiment of an environmentally isolated apparatus 200 that facilitates search and rescue (also designated herein as a sealed balloon 200). As shown in FIGS. 2A and 2B (collectively, FIG. 2), the sealed balloon 200 comprises a bottom substrate 210 that is substantially impermeable to water. Some embodiments of the bottom substrate 210 comprise reflective material. Also, for some embodiments, the bottom substrate 210 is substantially circular and has a diameter of between approximately fifty (50) centimeters and approximately two (2) meters. It should be appreciated that the bottom substrate 210 can be any geometric shape with a substantially equivalent surface area to that of a circular embodiment.

Next, several activators 220 are adhered to the surface of the bottom substrate 210. The activator can be an oxidant, such as, for example, sodium percarbonate, hydrogen peroxide, bromine, bromates, chlorinated isocyanurates, chlorates, chromates, dichromates, hydroperoxides, hypochlorites, inorganic peroxides, ketone peroxides, nitrates, nitric acid, nitrites, perborates, perchlorates, perchloric acid, periodates, permanganates, peroxides, peroxyacids, persulphates, or other oxidizers. Preferably, the activators 220 are arranged in a pattern that is readily distinguishable from patterns that occur naturally in open waters (meaning, a non-naturally occurring pattern). Consequently, the pattern allows for potentially faster and easier detection in open waters because it is less likely that the pattern will be mistaken for a naturally occurring reflection or naturally occurring luminescence.

The sealed balloon 200 also comprises a liquid-releasable vessel 230, which releases an illuminable dye that is contained therein. It should be appreciated that the activators 220 can also be arranged in a pattern that maximizes saturation or activation when the illuminable dye is released from the liquid-releasable vessel 230. Preferably, the arrangement pattern of the activators 220 in the sealed balloon strikes a balance between optimized saturation and optimized visibility. By way of example, the illuminable dye can be an oil-based dye or a dye comprising an organic solvent, such as, for example, dibutyl phthalate, dimethyl phthalate, dioctyl phthalate, butyl benzoate, ethyl benzoate, tert-butyl alcohol, tributyl citrate, triethyl citrate, dioctyl adipate, didecyl adipate, or ditridecyl adipate.

The bottom substrate 210 is covered with a transparent water-impermeable top 240 and a seal 250 provides an air-tight seal 250 around a periphery of the sealed balloon 200, thereby isolating the contents of the sealed balloon 200 from external elements. To the extent that industrial sealing processes (such as those used in mylar balloons) only a truncated discussion of the air-tight seal 250 is provided herein. Prior to activation, the sealed balloon 200 is substantially flat and can be folded or rolled to occupy a smaller space.

Figure 3A:
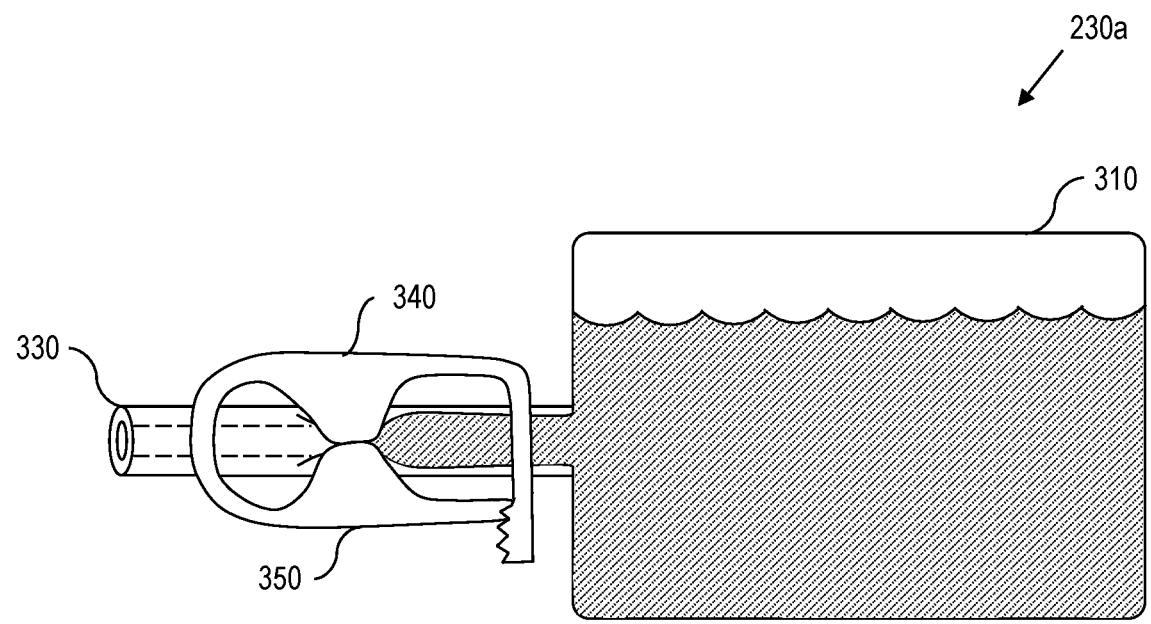
FIG. 3A is a diagram showing a liquid-releasable vessel with a closed release mechanism.
Figure 3B:
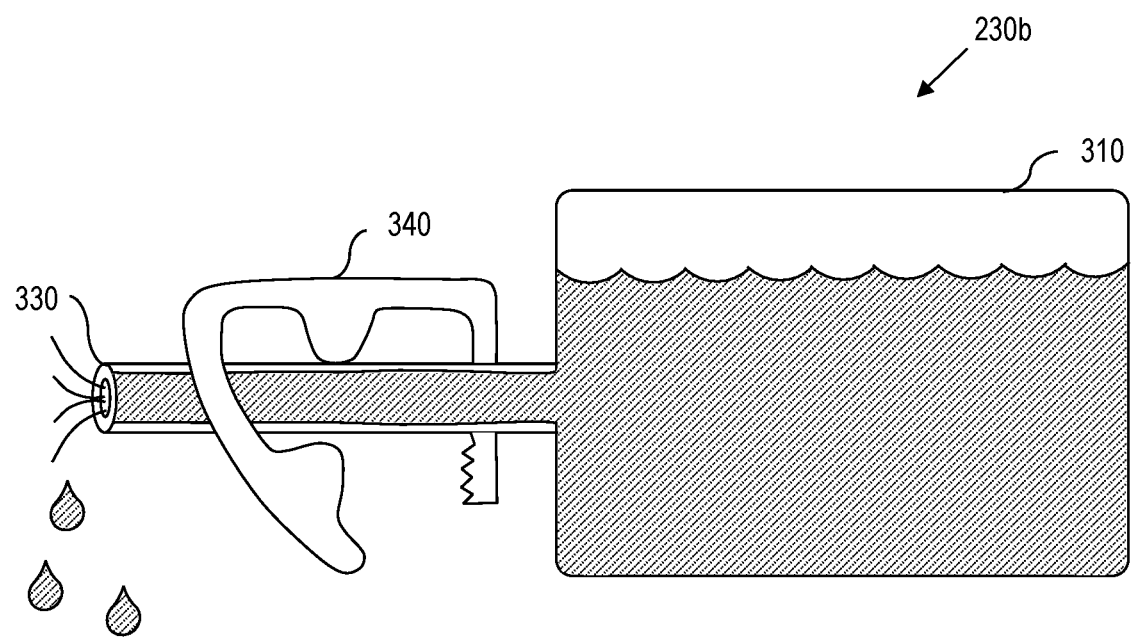
FIG. 3B is a diagram showing the liquid-releasable vessel of FIG. 3B with an open release mechanism.

Turning to FIGS. 3A and 3B, shown are a closed liquid-releasable vessel 230a and an open liquid-releasable vessel 230b, respectively. For the embodiment of FIG. 3A, the liquid-releasable vessel is a polyvinyl chloride (PVC) bag 310 that contains the illuminable dye 320. The PVC bag 310 comprises an opening 330, which is shown in FIG. 3A as a hose that extends from the PVC bag 310. The liquid-releasable vessel 230a further comprises a release mechanism 340 that selectively opens and closes the opening 330. In the embodiment of FIG. 3A, the release mechanism 340 is shown as a clamp 340, which when closed creates an occlusion 350 (or a pinch) that prevents the illuminable dye 320 from escaping the PVC bag 310. The open liquid-releasable vessel 230b in FIG. 3B shows the release mechanism 340 being open, thereby releasing the illuminable dye 320 through the opening 330.

Thus, returning to FIGS. 2A and 2B to continue discussing the operation of the sealed balloon 200, the illuminable dye is activated by opening the liquid-releasable vessel 230. A cross-section of the sealed balloon along the broken line A-A is shown in FIG. 2B. The illuminable dye reacts chemically with the activators 220. For some embodiments, some of the activators 220 can be coated with a dissolvable coating, thereby allowing different activators 220 to be activated at different times after the release of the illuminable dye. In other words, by applying different time-release coatings to certain activators 220, it is possible to cascade in time the luminescence from one set of activators 220 to another set of activators 220, and so on, based on the rates at which the coatings dissolve.

Continuing, the chemical reaction produces two (2) results. First, the chemical reaction creates a luminescence at a given wavelength. Preferably, the wavelength is in the range of ultraviolet (UV) light, but it should be appreciated that the chemicals can be customized to emit at different wavelengths and for different durations. Second, the chemical reaction releases a gas, which inflates the sealed balloon 200. As noted above, both the activators 220 and the liquid-releasable vessel 230 are enclosed in the apparatus and sealed from external elements using an air-tight seal 250. Thus, if a gas is released from the chemical reaction, then the released gas inflates the sealed balloon 200 because the gas cannot escape through the seal 250. By way of example, if the sealed balloon 200 has a sixty-centimeter (60 cm) diameter, then the liquid-releasable vessel 230 contains approximately one hundred milliliters (100 mL) of illuminable dye. Correspondingly, if the sealed balloon 200 has a 1.5-meter (m) diameter, then approximately 200 mL of dye should suffice. Those having skill in the art can readily calculate the amount of illuminable dye that will be sufficient to react with the pattern of activators 220.

By way of example, if the illuminable dye is an oil-based dye (e.g., dibutyl phthalate, dimethyl phthalate, dioctyl phthalate, butyl benzoate, ethyl benzoate, tert-butyl alcohol, tributyl citrate, triethyl citrate, dioctyl adipate, didecyl adipate, or ditridecyl adipate), and the activator 220 is a hydrogen-containing oxidant (e.g., sodium percarbonate, hydrogen peroxide, bromine, bromates, chlorinated isocyanurates, chlorates, chromates, dichromates, hydroperoxides, hypochlorites, inorganic peroxides, ketone peroxides, nitrates, nitric acid, nitrites, perborates, perchlorates, perchloric acid, periodates, permanganates, peroxides, peroxyacids, persulphates, or other oxidizers), then hydrogen gas is released from the reaction and fills the sealed balloon 200.

Because the sealed balloon 200 has an air-tight seal 250, the illuminable dye continues to wash over the activators 220 as the isolated apparatus undulates or jolts with the waves in the water. The continued washing of the activators 220 allows for unreacted activators 220 to be activated by the illuminable dye. In other words, continued movement of the illuminable dye within the sealed balloon 200 results in a more complete reaction between the illuminable dye and all of the activators 220. The air-tight seal 250 also prevents dissipation of the illuminable dye or the activators 220 in open water because neither the dye nor the activator 220 can escape the sealed balloon 200. Thus, the sealed balloon 200 is visible for a longer period than devices that release dyes into open waters. Preferably, the sealed balloon 200 provides visibility (at a twenty degree (20°) cone of view) from a distance of up to (or greater than) approximately 400 m for some embodiments and up to (or greater than) approximately 1.5 kilometers (km) for other embodiments, depending on the luminescent intensity. For some embodiments, once the sealed balloon 200 begins to luminesce, it becomes detectable using drones, space-based assets (e.g., satellites), or other un-manned vehicles.

The sealed balloon 200 can be securely attached to an individual or, alternatively, the sealed balloon 200 can be securely attached to a life raft using, for example, a clip or other type of harness. For such embodiments, it should be appreciated that the sealed balloon 200 can include a tethering hole to which a tether is secured. Additionally, to prevent capsizing or overturning in turbulent waters, a weight or other know devices to keep the transparent top 240 facing upward (rather than facing toward the water).

In yet another embodiment, emissions from the luminescent materials can be collimated using a parabolic substrate. The parabolic geometry allows for more concentrated or focused emissions of light. The embodiment having a parabolic geometry is shown in greater detail with reference to FIGS. 4A, 4B, 4C, and 4D (collectively, FIG. 4).

Figure 4A:
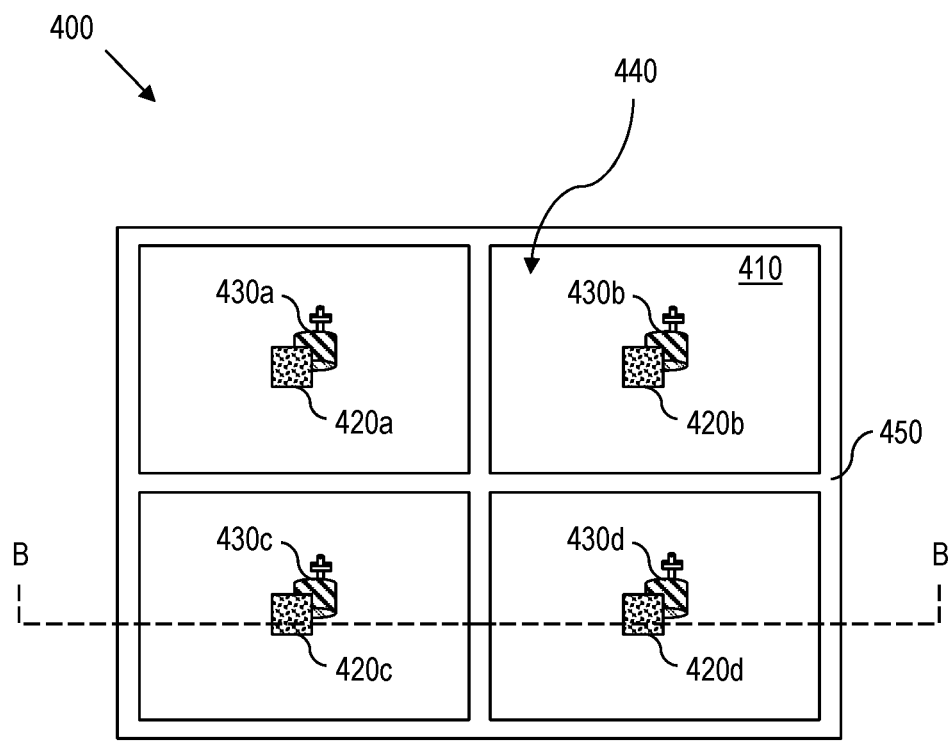
FIG. 4A is a diagram showing a top view of another embodiment of an apparatus that facilitates search and rescue.

FIG. 4A shows one embodiment of the apparatus 400 having a parabolic geometry (designated herein as a parabolic embodiment 400 for convenience). The parabolic embodiment 400 comprises a reflective substrate 410 with a substrate perimeter (shown in FIG. 4A as having a substrate geometry that is substantially square). When the parabolic embodiment 400 is deployed, the reflective substrate 410 forms a reflective parabolic surface or a reflective parabolic geometry with a focal point.

As shown in FIG. 4A, the number of parabolic surfaces can be increased by sub-dividing the reflective substrate 410 (e.g., four (4) separate parabolic surfaces are shown in FIG. 4A). Unlike the sealed balloon 200 of FIG. 2, the parabolic embodiment 400 comprises activators 420a, 420b, 420c, 420d (collectively, 420) that are placed at the center of each sub-divided parabolic reflective surface 410, with each activator 420 being operatively coupled to its respective liquid-releasable vessel 430a, 430b, 430c, 430d (collectively, 430), each of which contains illuminable dye. A transparent cover 440 is placed atop the reflective substrate 410. Similar to the reflective substrate 410, the transparent cover comprises a cover geometry (also shown as being substantially square in FIG. 4A) and a cover perimeter that corresponds substantially with the substrate perimeter. An air-tight seal 450 is formed to seal the substrate perimeter to the cover perimeter to create a sealed internal region. For some embodiments, an air-tight seal 450 also separates each of the parabolic reflector sub-divisions (as shown in FIG. 4A).

Figure 4B:
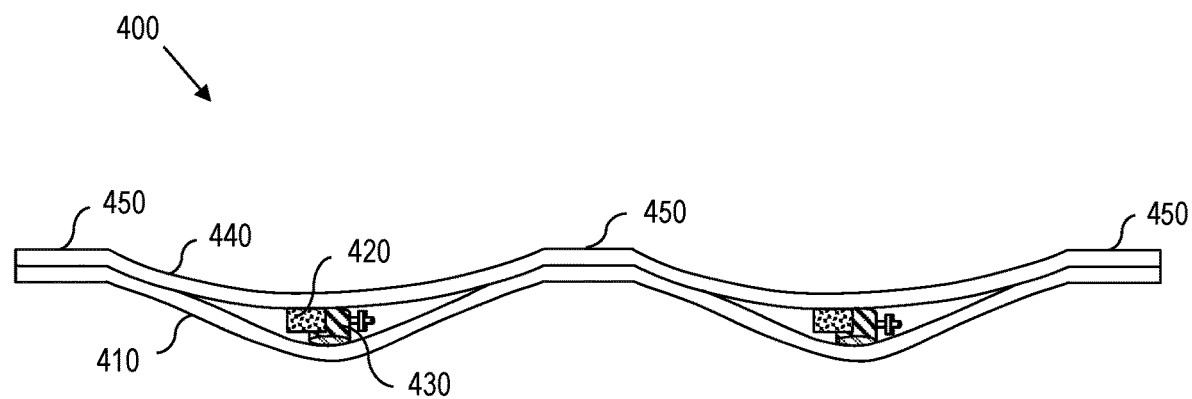
FIG. 4B is a diagram showing a side cut-away view of the apparatus of FIG. 4A prior to deployment of the apparatus.

Continuing to FIG. 4B, a cross section of the parabolic embodiment 400 (along the broken line B-B) prior to activation is shown. Unlike the sealed balloon 200 of FIG. 2, the parabolic embodiment 400 affixes the activators 420 to the transparent cover 440 (using, for example, an adhesive or tape or other appropriate means), rather than to the reflective substrate 410. In other words, each activator 420 is located approximately at the focal point. The activators 420 are each located within its respective sealed internal region. Liquid-releasable vessels 430 (or liquid-releasable vessels) are each operatively coupled to its respective activator 420 (and, thus, also located within the corresponding sealed internal region). Unlike the sealed balloon 200, which has a patterned array of activators 220 within the sealed area, each sealed internal region in the parabolic embodiment 400 comprises a single activator 420 that is located at the respective center of each of the sealed internal region.

Figure 4C:
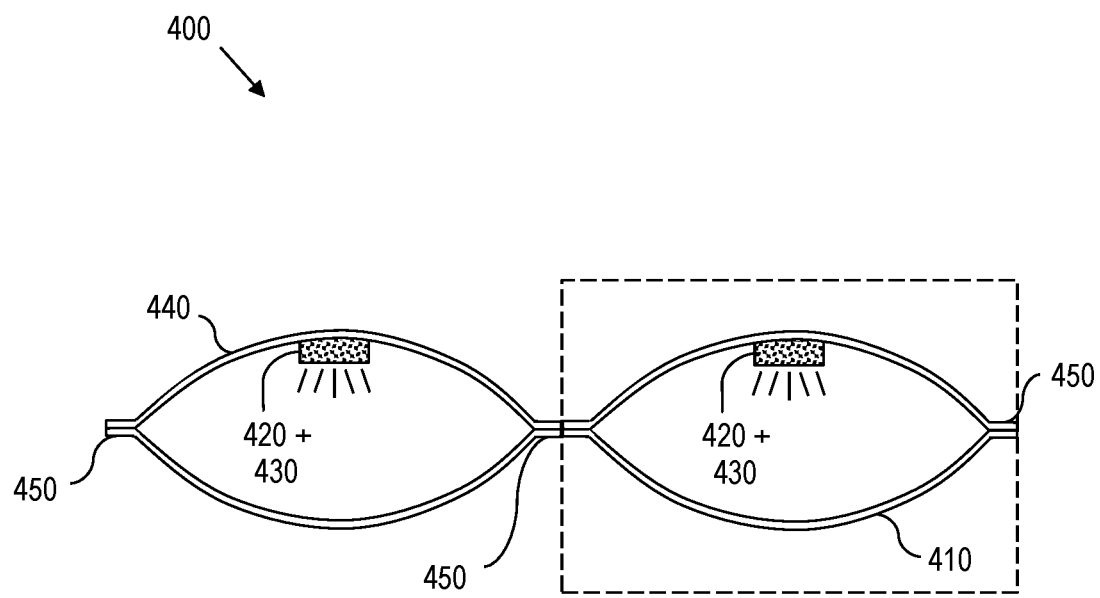
FIG. 4C is a diagram showing a side cut-away view of the apparatus of FIG. 4A upon deployment of the apparatus.

Continuing, FIG. 4C shows the parabolic embodiment 400 (along B-B) upon deployment. As noted above, each liquid-releasable vessel 430 is operatively coupled to its respective activator 420. Thus, upon opening of the liquid-releasable vessel 430, the illuminable dye contained in each liquid-releasable vessel 430 is released and reacts promptly with its respective activator 420. The reaction between the illuminable dye and the activator 420 releases a gas that inflates the parabolic embodiment 400. Concurrent with the inflation, the combination of the activator 420 and the illuminable dye results in luminescence.

Figure 4D:
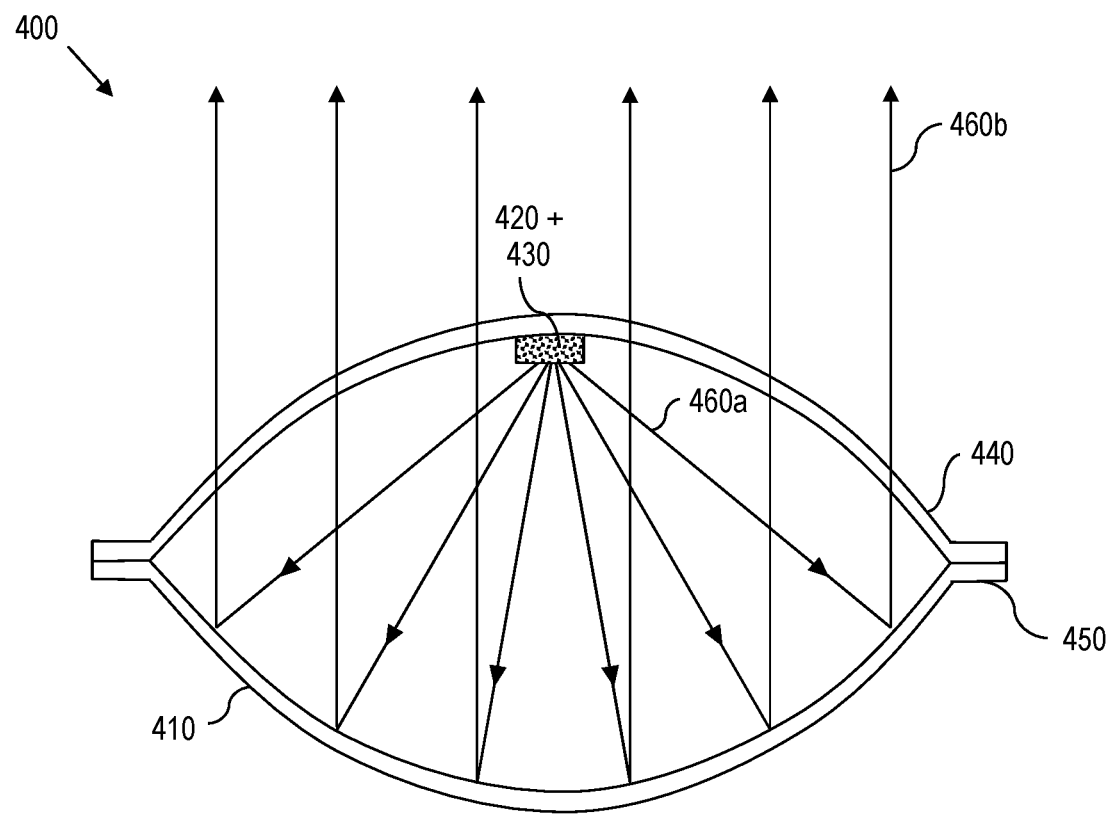
FIG. 4D is a diagram showing a focusing behavior of light in the apparatus of FIG. 4A.

Turning to FIG. 4D, which shows an enlarged view of one of the parabolic sub-divisions of FIG. 4A, when the parabolic embodiment 400 is deployed, the luminescent combination of the activator 420 and the illuminable dye separates from the reflective substrate 410 approximately to a focal point. It should be appreciated that the precise location of the focal point is dependent on many factors, such as the geometric shape of the reflective substrate 410, the geometric shape of the transparent cover 440, the size of each parabolic sub-division, the degree to which each parabolic sub-division inflates, etc. However, how to position the activator 420 on the transparent cover 440 prior to deployment so that the activator 420 becomes affixed at the parabolic focal point after deployment is a determination that can be done readily by those having skill in the art and, thus, further discussion of the placement of the activator 420 is omitted herein. What is significant for FIG. 4D is that the focal point be located on or near the transparent cover 440.

Continuing with FIG. 4D, when the combination of the activator 420 with the illuminable dye luminesces approximately at the focal point, the emitted light 460a (whether visible or UV or otherwise) is reflected from the reflective substrate 410 and emerges as collimated light 460b. The focused (and now collimated) light 460b has a greater concentrated intensity than the light from the sealed balloon 200. Consequently, the parabolic embodiment 400 provides visibility from a greater distance than the sealed balloon 200.

As shown in the embodiments of FIGS. 1 through 6, an individual is tethered to a deployable apparatus (through, for example, a tethering hole on the deployable apparatus). The deployable apparatus combines an illuminable dye with an activator, thereby increasing immensely the visibility of an individual in open water. The increased visibility facilitates maritime (or other open-water-based) search and rescue operations.

Although exemplary embodiments have been shown and described, it will be clear to those of ordinary skill in the art that a number of changes, modifications, or alterations to the disclosure as described may be made. For example, although an embodiment is shown in which the activator is located on the substrate and the illuminable dye is released from a liquid-releasable vessel, it should be appreciated that the illuminable dye can be located on the substrate, with the activator being released from the liquid-releasable vessel. Furthermore, although specific dimensions and chemical compositions are recited for clarity, it should be appreciated that the disclosed embodiments are not limited to only the recited dimensions or chemical compositions. Additionally, although the embodiments are described in the context of maritime search and rescue, those having skill in the art will understand that the increased visibility is beneficial in land-based operations or land-based environments. Also, those having skill in the art will appreciate that certain features of one embodiment can be implemented in other embodiments to realize advantages that are greater in combination than in isolation. All such changes, modifications, and alterations should therefore be seen as within the scope of the disclosure.

What is claimed is:

1. An apparatus, comprising:
   a substrate comprising:
      a substrate geometry; and
      a substrate perimeter;
   a transparent cover positioned atop the substrate, the transparent cover comprising:
      a cover geometry that corresponds to the substrate geometry; and
      a cover perimeter that corresponds to the substrate perimeter;
   an air-tight seal that seals the substrate perimeter to the cover perimeter, the air-tight seal creating a sealed internal region;
   a liquid-releasable vessel located in the sealed internal region;
   an illuminable dye located in the liquid-releasable vessel;
   an opening in the liquid-releasable vessel;
   a release mechanism operatively coupled to the opening, the release mechanism for selectively opening and closing the opening, the release mechanism for further selectively releasing the illuminable dye from the liquid-releasable vessel through the opening; and
   an activator located in the sealed internal region, the activator for illuminating the illuminable dye.

2. The apparatus of claim 1, the release mechanism being a clamp.

3. The apparatus of claim 1, further comprising a pattern of activators located on the substrate.

4. The apparatus of claim 3, the pattern of activators comprising a dissolvable coating to allow cascaded luminescence of the activators over time.

5. The apparatus of claim 3, the liquid-releasable vessel comprising an amount of illuminable dye that is sufficient to react with the pattern of activators.

6. The apparatus of claim 5, the pattern being one that maximizes activation of the pattern of activators.

7. The apparatus of claim 5, the pattern being one that strikes a balance between optimized activation of the pattern of activators and optimized visibility.

8. The apparatus of claim 3, the pattern being a non-naturally occurring pattern.

9. The apparatus of claim 1, a combination of the activator and the illuminable dye being visible from a distance of at least six hundred meters (400m).

10. The apparatus of claim 9, the combination of the activator and the illuminable dye being visible from a distance of at least 1.5 kilometers (km).

11. The apparatus of claim 1, wherein the illuminable dye is a chemiluminescent dye.

12. The apparatus of claim 1, wherein the illuminable dye is a bioluminescent dye.

13. The apparatus of claim 1, wherein the illuminable dye is an oil-based dye.

14. The apparatus of claim 1, wherein the illuminable dye comprises an organic solvent selected from the group consisting of:
   dibutyl phthalate;
   dimethyl phthalate;
   dioctyl phthalate;
   butyl benzoate;
   ethyl benzoate;
   tert-butyl alcohol;
   tributyl citrate;
   triethyl citrate;
   dioctyl adipate;
   didecyl adipate; and
   ditridecyl adipate.

15. The apparatus of claim 1, wherein the activator comprises an oxidant selected from the group consisting of:
   sodium percarbonate;
   hydrogen peroxide;
   bromine;
   bromates;
   chlorinated isocyanurates;
   chlorates;
   chromates;
   dichromates;
   hydroperoxides;
   hypochlorites;
   inorganic peroxides;
   ketone peroxides;
   nitrates;
   nitric acid;
   nitrites;
   perborates;
   perchlorates;
   perchloric acid;
   periodates;
   permanganates;
   peroxides;
   peroxyacids; and
   persulphates.

16. An environmentally isolated apparatus comprising:
   a liquid-releasable vessel located in the environmentally isolated apparatus;
   an illuminable dye located in the liquid-releasable vessel;
   an opening in the liquid-releasable vessel;
   a release mechanism operatively coupled to the opening, the release mechanism for selectively opening and closing the opening, the release mechanism for further selectively releasing the illuminable dye from the liquid-releasable vessel through the opening; and
   an activator located in the environmentally isolated apparatus, the activator for illuminating the illuminable dye.

17. The apparatus of claim 16, the release mechanism being a clamp.

18. The apparatus of claim 16, a combination of the activator and the illuminable dye being visible from a distance of at least six hundred meters (400m).

19. The apparatus of claim 18, the combination of the activator and the illuminable dye being visible from a distance of at least 1.5 kilometers (km).

20. The apparatus of claim 16, wherein:
   the illuminable dye comprises an organic solvent selected from the group consisting of:
      dibutyl phthalate;

dimethyl phthalate;
dioctyl phthalate;
butyl benzoate;
ethyl benzoate;
tert-butyl alcohol;
tributyl citrate;
triethyl citrate;
dioctyl adipate;
didecyl adipate; and
ditridecyl adipate; and the activator comprises an oxidant selected from the group consisting of:
sodium percarbonate;
hydrogen peroxide;
bromine;
bromates;
chlorinated isocyanurates;
chlorates;
chromates;
dichromates;
hydroperoxides;
hypochlorites;
inorganic peroxides;
ketone peroxides;
nitrates;
nitric acid;
nitrites;
perborates;
perchlorates;
perchloric acid;
periodates;
permanganates;
peroxides;
peroxyacids; and
persulphates.

* * * * *